Patented Jan. 14, 1947

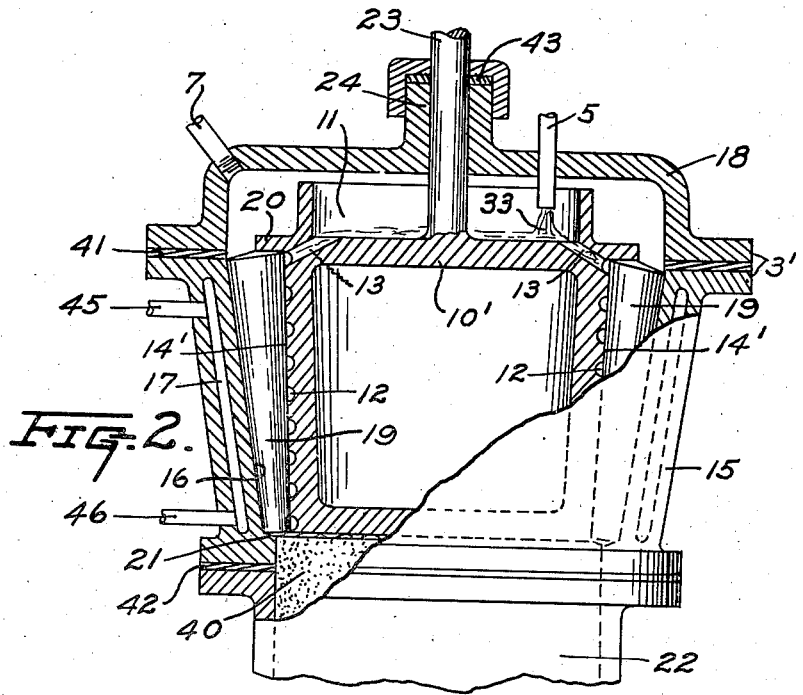
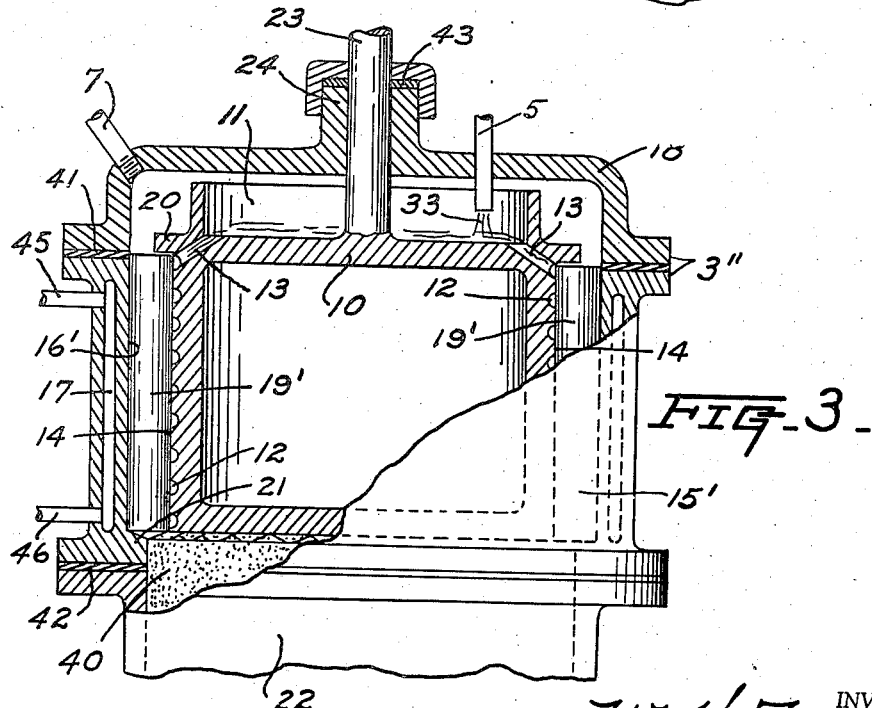

2,414,215

UNITED STATES PATENT OFFICE 2,414,215

DEHYDRATING APPARATUS

William H. Taylor, Waukesha County, Wis.

Application April 29, 1943, Serial No. 484,948

13 Claims. (Cl. 159—12)

The present invention relates generally to improvements in the art of dehydration, and relates more specifically to improvements in the construction and operation of machines for removing excess liquid from solids suspended in various solutions such as milk, fruit juices, and the like.

The primary object of my present invention is to provide an improved dehydrating machine which is relatively simple in construction and highly efficient in operation.

Some of the more important specific objects of the invention are as follows:

To provide improved apparatus for removing liquid from solids normally carried in suspension therein, by evaporation and in a rapid and effective manner.

To provide an improved system of separating solids from liquids continuously and automatically, and with the aid of relatively simple and compact equipment.

To provide a new and useful dehydrator in which liquid is not only quickly and effectively removed from solids, but in which the dry solid material is also reduced to a powder.

To provide an improved dehydrating unit having maximum evaporating surface and resultant capacity considering the space actually occupied thereby, and which is operable with minimum attention by a novice.

To provide an improved dehydration machine which is simple and durable in construction, which can be constructed and operated at moderate cost, and all parts of which are readily accessible for inspection and cleaning.

These and other specific objects and advantages of the present invention will be apparent from the following detailed description.

A clear conception of the several features constituting my present improvement, and of the mode of constructing and of operating several types of the improved dehydrating units, may be had by referring to the drawings accompanying and forming a part of this specification in which like reference characters designate the same or similar parts.

Fig. 2 is a fragmentary section through a modified unit provided with tapered rollers and a tapered rotor; and Fig. 3 is a similar section through a further modification having cylindrical rollers and a cylindrical rotor.

Figure 1:
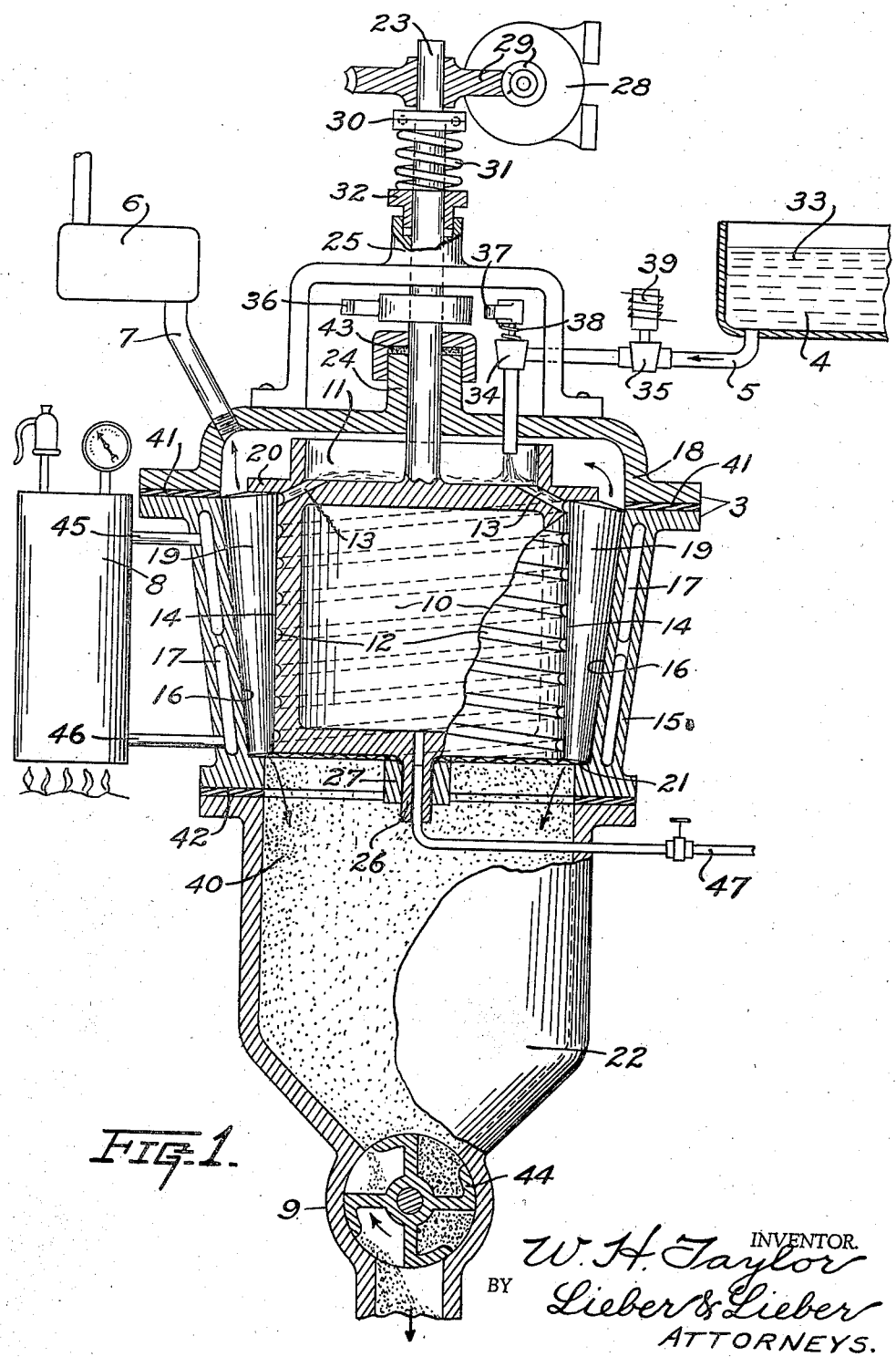
Fig. 1 is a diagram of a dehydrating system embodying my invention, showing a central vertical section through a main evaporating unit provided with tapered rollers and a cylindrical rotor.

While the invention has been shown and described herein as being embodied in a system and units especially adapted for the purpose of dehydrating solutions such as milk or fruit juices so as to produce concentrated solid constituents in powdered form, it is not my desire or intent to unnecessarily restrict the scope or utility of the improvement by virtue of this specific disclosure.

Referring to Fig. 1 of the drawings, the system shown therein for effecting continuous and automatic dehydration of diverse solutions, comprises in general an improved liquid evaporating and solids pulverizing unit 3; a fluent mixture or solution supply source or container 4 communicable with the upper portion of the unit 3 through a supply pipe 5; a condenser or vacuum pump 6 also communicable with the upper portion of the unit 3 through a suction pipe 7; a source of heat such as a steam boiler 8 for supplying heating agent to the evaporating surfaces of the unit 3; and a discharge device 9 for effecting constant or intermittent removal of pulverized dry solids from the lower portion of the unit 3. The container 4, pump 6, boiler 8, and device 9 may all be of relatively well known and conventional design, but the unit 3 is of improved construction and operation.

The improved liquid evaporating and solids pulverizing unit 3 consists primarily of a rotor revolvable about a vertical axis and having a hollow cylindrical body 10 provided with a fresh solution supply basin 11 at its upper end and also having a liquid distributing formation such as helical grooves 12 communicating with the basin 11 through passages 13 and extending downwardly along its peripheral smooth outer surface 14; a sealed casing comprising an annular lower section 15 surrounding the rotor element or body 10 and being provided with an annular inner evaporating surface 16 surrounded by an annular heating jacket 17, and an upper cover section 18 coacting with the lower section 15; an annular series of tapered members or rollers 19 snugly confined within the annular space between the surfaces 14, 16 by means of an annular upper flange 20 formed on the body 10 and an annular lower ledge 21 formed on the casing section 15, and frictionally engaging each other and the surfaces 14, 16; and a powdered material collecting and discharge receptacle 22 coacting with the lower end of the casing section 15 and having the discharge device 9 associated with its lower portion.

The rotor body 10 is suspended for rotation within the casing section 15 by means of an upper drive shaft 23 coacting with a bearing 24 in the cover section 18 and with an outer bearing 25 supported on this casing section 18, and may be additionally provided with a lower stub shaft 26 coacting with a spider bearing 27 suspended from the lower casing section 15. The drive shaft 23 may be rotated at any desired speed by means of a motor 28 coacting with the upper end of the shaft 23 through speed reduction gearing 29, and in order to partially balance the weight of the rotor and to relieve undesirable pressure and wear on the tapered rollers 19, I may provide an anti-friction thrust bearing 30 carried by a spring 31 coacting with a vertically adjustable nut 32 associated with the upper outer bearing 25. It will be apparent that this assemblage of elements will permit wear on the working parts of the machine to be compensated for by slight downward adjustment or lowering of the rotor body 10 so that perfect thermal contact of the rollers 19 with the surfaces 14, 16 is assured at all times.

The fresh solution supply container 4 which communicates with the basin 11 through the supply pipe 5 should preferably be amply supplied with fresh solution 33 and should also be located well above the cover section 18, and the conducting pipe 5 may be provided with several flow control valves 34, 35 in order to insure accurate and uniform feeding of the fresh liquid to the unit. The valve 34 is operable intermittently, once for each revolution of the rotor body 10, by means of a cam 36 carried by the drive shaft 23 and cooperating with a cam arm 37 secured to the valve 34, so as to periodically open the valve 34 wide and to thereby permit successive batches of fresh solution to enter the basin 11. This valve 34 may be closed automatically by means of a torsion spring 38 in an obvious manner. The valve 35 is preferably operable by means of an electric solenoid 39 so that this valve 35 will be opened only when the load on the driving motor 28 reaches a predetermined value. As the liquid films near the lower ends of the rollers 19 become dry, there is a sudden increase in power required to propel the motor 28, and more fresh solution should then be admitted to the apparatus by means of the solenoid actuated valve 35. This will insure the production of uniformly dehydrated solid material 40, and the flow of liquid from the basin 11 through the distributing passages 13 and along the grooves 12 will obviously be produced by gravity.

Since it is preferable to dehydrate certain products such as fruit juices and milk in a partial vacuum, the evaporating chamber should be hermetically sealed, and a source of vacuum such as a condenser or vacuum pump 6 should be provided to quickly remove the vapors resulting from the evaportion. The lower annular casing section 15 should therefore be detachably connected with the cover section 18 and with the solids collecting chamber 22, through sealing and heat insulating gaskets 41, 42 respectively, and a suitable stuffing box 43 should also be provided at the inner bearing 24. The casing sections 15, 18 and the chamber 22 should however be readily separable from each other so as to permit quick removal for internal inspection and thorough cleaning of the various normally concealed parts, and the dry solids discharge device 9 may be formed as a constantly revolving rotor 44 so constructed that it will deliver the final dry product from the machine without admitting air to the evaporating chamber.

The heat supply source or boiler 8 is connected to the annular jacket 17 formed in the lower casing section 15, by means of supply and return pipes 45, 46 respectively; and heat may also be introduced into the hollow interior of the rotating body 10 through a central passage formed within the lower shaft 26, by means of a valve controlled pipe 47. The rollers 19 may also be formed of aluminum or other metal having high heat conductivity, so as to transmit heat from the casing section 15 to the rotor body 10, or vice versa, and the rollers 19 are preferably numerous and of relatively small diameter in order to provide extensive evaporating surface as well as a large number of contact zones for effecting rapid transmission of heat from the heating surfaces 14, 16 to the material being treated. While the rollers 19 of Fig. 1 are tapered and the rotor body 10 is cylindrical, these elements may be formed differently depending upon the nature of the material being treated.

For example, in Fig. 2 the rollers 19 of the unit 3' are tapered and are caused to coact with a modified rotor body 10' having a downwardly tapered external surface 14' with which the rollers 19 coact. The taper of this contact surface 14', of the inner surface 16 of the casing section 15, and of the rollers 19, may be such that the tapered rollers 19 not only have line contact with the surfaces 14', 16, but also have such line contact with the adjacent rollers 19 of the annular series, thus eliminating differential surface slippage such as occurs in the unit 3 of Fig. 1. In the further modification of Fig. 3, such differential surface slippage is avoided, by forming the rollers 19' of the unit 3" cylindrical, and by also forming the contacting outer surface 14 of the rotor 10 and the inner surface 16' of the casing section 15' cylindrical. Otherwise the units 3, 3', 3" may be similar in construction and action, and either of the three modifications may be used for best treatment of the particular product or material being dehydrated. Since the operation of the several modifications is similar, it will suffice to describe the normal use of only one of them; and if so desired, the same casings, or rollers, or rotors may be used interchangeably in several of the different types of machines specifically described herein.

During normal use of the improved dehydrating unit, the rotor body 10 should be revolved at the desired speed by operation of the driving motor 28, and an abundant supply of fresh solution 33 should be admitted to the supply receptacle or container 4. The boiler 8 should be operated so as to deliver heating medium to the jacket 17, and perhaps also to the interior of the rotor 10, and the vacuum pump 6 should be actuated so as to produce a partial vacuum within the casing sections 15, 18 while the final discharge rotor 44 should be operated to continuously deliver dried material from the collecting chamber 22.

The solution to be treated will then flow by gravity from the container 4 through the pipe 5 and past the valves 34, 35 into the basin 11, from which the fluent material will escape through the passages 13 and will flow downwardly along the helical grooves 12. These grooves will thereafter permit the solution to escape against the peripheries of the revolving rollers 19, which are being revolved by virtue of their contact with the peripheral surface 14 of the body 10. The annular series of tapered rollers 19 which have rolling contact with both of the annular surfaces 14, 16 and with each other, rapidly distribute the fluent material escaping from the grooves 12 over the entire surfaces 14, 16 and over their own surfaces, so that evaporation of the liquid takes place rapidly from all of these film coated surfaces, and the vapors resulting from such evaporation are promptly withdrawn upwardly through the annular gap between the periphery of the flange 20 and the interior side surface of the cover section 18, and are withdrawn through the pipe 7 by the vacuum pump 6. The constant rolling action produced by the tapered rollers 19 against the surfaces 14, 16 and against each other, causes the film surface to be broken up and permits a new liquid film to be constantly formed and exposed to the evaporating zones between the surfaces 14, 16 and the rollers, thus constantly stirring and mixing the solution and preventing hardening and burning such as is usually experienced in dehydrating equipment. The heat insulating gaskets 41, 42 while permitting some liquid to adhere to parts of the main casing, will effectively prevent this adhering liquid from burning, and as the moisture is withdrawn from the solution which flows slowly downwardly over the evaporating surfaces, the substance becomes more viscous and is finally completely dried near the lower portion of the evaporating zone. The rolling action of the rollers 19 then constantly grinds and removes the dry film which falls in the form of a fine powder into the discharge chamber 22 from which it is periodically withdrawn by the rotor 44 and is delivered from the machine. In this manner complete dehydration of the viscous material is promptly accomplished while the vapors resulting from such dehydration are constantly and rapidly withdrawn from within the machine, and the resultant dry material is simultaneously pulverized by the revolving annular series of rollers which also insure accelerated dehydration by constantly agitating and distributing the fresh solution.

During such normal operation of the improved unit, the gaskets 41, 42, the stuffing box 43 and the discharge rotor 44 prevent ingress of air into the evaporating chamber, and the suction produced by the vacuum pump 6 insures rapid entry of fresh solution whenever the valves 34, 35 are opened. The normal operation of the machine is continuous and entirely automatic, and periodic inspection of the interior of the unit may be readily made by merely removing the cover 18 together with the rotor, from the lower casing section 15. Upon removal of these elements, the series of rollers 19 may be readily removed, and all parts can be conveniently cleaned so as to maintain the same in sanitary condition. The batch feeding afforded by the cam actuated valve 34 will normally insure delivery of an abundant supply of fresh solution to the basin 11, and the solenoid actuated valve 35 further insures control of the admitted solution in accordance with the power consumption of the machine. The thrust bearing 30 and spring 31 cooperating with the adjusting nut 32 prevent the creation of excess friction between the rollers 19 and the surfaces 14, 16, and also permit convenient adjustment of the rotor to compensate for wear. The degree of this adjustment will normally be slight since excessive wear will not occur due to the fact that the revolving rollers 19 act as an anti-friction bearing between the rotating body 10 and the stationary casing section 15, and the machine obviously requires no personal attention after it is once placed in satisfactory operating condition.

From the foregoing detailed description it will be apparent that my present invention provides an improved dehydrating unit which is extremely simple and compact in construction and which is moreover highly efficient in operation. The improved assemblage is also extremely durable and entirely automatic in operation, and has enormous capacity considering the space occupied by the equipment. The structure is obviously readily accessible for internal inspection and cleaning and may therefore be maintained in highly sanitary condition at all times. The improved roller and rotor assemblage provides extended evaporating surface for effecting quick evaporation of the liquid, and the final dry solid produced is not only uniformly dried but is also uniformly pulverized before delivery thereof from the machine. The vertical disposition of the machine and the fact that the rotor and the rollers are revolvable about a vertical axis, permits ready feeding and distribution of the solution by gravity, and also facilitates removal of the dry solids by gravity, thereby enhancing the capacity of the machine to a maximum. While the differential surface slippage between the rollers and their contacting surfaces in Fig. 1, may be advantageous in enhancing the grinding or reduction of some materials, it may be objectionable in other cases, whereupon the modified assemblages of Figs. 2 and 3 may be employed. The improved mechanism can obviously be manufactured at relatively low cost, and may be operated at minimum expense by a novice, so as to produce maximum output capacity.

It should be understood that it is not desired to limit this invention to the exact details of construction or to the precise mode of operation, herein shown and described, for various modifications within the scope of the claims may occur to persons skilled in the art.

I claim:

1. In combination, a rotor revolvable about a vertical axis and having a helical peripheral solution distributing groove thereon, means for feeding solution downwardly along said groove, an annular casing surrounding said rotor, a series of rollers rotatable in contact with the periphery of said rotor in open communication with said groove and in contact with said casing to transfer solution from the rotor to the casing, and means for heating said roller.

2. In combination, a rotor revolvable about a vertical axis and having a helical peripheral solution distributing groove thereon, means for feeding solution downwardly along said groove, an annular casing surrounding said rotor, an annular series of laterally contacting rollers rotatable in contact with the periphery of said rotor in open communication with said helical groove and in contact with said casing to transfer solution from the rotor to the casing, and means for simultaneously heating said rollers.

3. In combination, a rotor having a peripheral outwardly open helical groove therein, means for feeding solution into and along said groove, an annular series of longitudinally tapered rollers rotatable by frictional contact with the periphery of said rotor adjoining said groove, and annular heating means surrounding said roller series and cooperating therewith to impart heat to said rotor and groove.

4. In combination, a rotary element, an annular element spaced from said rotary element, one of said elements being heated and the rotary element having a helical groove therein extending along the intervening space and opening toward the heated element, means for feeding solution along said groove for direct distribution of the solution along the adjacent surfaces of said elements, and an annular series of contacting rollers revolvable by said rotary element within the annular space between said elements and in rolling contact with the adjacent surfaces of both of said elements.

5. In combination, an internal circular element, an external annular element surrounding and spaced from said internal element, one of said elements being heated and the other being rotatable and having a solution distributing groove therein extending along the intervening space and opening toward the heated element, means for feeding solution to said groove, and a roller revolvable along and within the space between said elements and in contact with both elements.

6. In combination, an internal circular element, an external annular element surrounding and spaced from said internal element, one of said elements being heated and the other being rotatable and having a solution distributing groove therein extending along the intervening space and opening toward the heated element, means for feeding solution to said groove, and an annular series of contacting rollers revolvable by friction within said space and along and in contact with both of said elements.

7. In combination, a rotor rotatable about an upright axis and having helical peripheral grooves extending downwardly therealong, an annular heated casing surrounding and spaced from the grooved periphery of said rotor, means for feeding solution by gravity downwardly along said grooves, and an annular series of rollers frictionally contacting the adjacent surfaces of said rotor and of said casing within said space.

8. In combination, a rotor rotatable about an upright axis and having helical peripheral grooves extending downwardly therealong, an annular heated casing surrounding and spaced from the grooved periphery of said rotor, means for feeding solution by gravity into the upper end of the intervening space downwardly along said grooves, an annular series of longitudinally tapered rollers frictionally contacting the adjacent surfaces of said rotor and of said casing and extending along said space, and means for constantly removing dry material from the lower end of said space.

9. In a dehydrator, a rotor revolvable about an axis, an annular casing surrounding and spaced from said rotor, means for feeding solution into the intervening space, a series of rollers revolvable within said space in contact with both said rotor and casing to transfer said solution across the space, means for removing dry material derived from said solution from one end of said space, and means for evacuating moisture derived from said solution from the opposite end of said space.

10. In a dehydrator, a rotor revolvable about an axis, an annular casing surrounding and spaced from said rotor, means for feeding solution into the intervening space, a series of rollers revolvable within said space in contact with both said rotor and casing to transfer said solution across the space, means for heating said space to separate the moisture of said solution from the dry solid material, means for removing dry material derived from said solution from one end of said space, and means for evacuating moisture derived from said solution from the opposite end of said space.

11. In combination, a rotor, a casing surrounding and spaced from said rotor, means for intermittently feeding solution to said space, means for heating said space, a series of rollers revolvable within said space, all of said rollers being constantly in contact with both said rotor and casing to transfer said solution across the space, and means for constantly removing dry material derived from said solution from said space.

12. In combination, a rotor, a casing surrounding and spaced from said rotor, means for intermittently feeding solution to said space, means for heating said space, a series of rollers revolvable within said space, all of said rollers being constantly in contact with both said rotor and casing to transfer said solution across the space, means for removing dry material derived from said solution from one end of said space, and means for evacuating moisture derived from said solution from the opposite end of said space.

13. In combination, a rotor revolvable about an upright axis, an annular heated casing surrounding and spaced from said rotor, means for feeding solution to said space along said rotor, an annular series of rollers revolvable within said space, all of said rollers being constantly in contact with both said rotor and casing to transfer said solution across the space, means for removing dry powder derived from said solution from the lower end of said space, and means for removing moisture derived from said solution from the upper end of said space.

WILLIAM H. TAYLOR.